(12) United States Patent
Lee et al.

(10) Patent No.: US 8,847,107 B2
(45) Date of Patent: Sep. 30, 2014

(54) LASER WELDING DEVICE FOR ROLL FORMING SYSTEM AND CONTROL METHOD THEREOF

(75) Inventors: Mun-Yong Lee, Pusan (KR); Hyun-Uk Seol, Pusan (KR)

(73) Assignee: Sungwoo Hitech Co., Ltd., Pusan (KR)

( * ) Notice: Subject to any disclaimer, the term of this patent is extended or adjusted under 35 U.S.C. 154(b) by 758 days.

(21) Appl. No.: 12/969,665

(22) Filed: Dec. 16, 2010

(65) Prior Publication Data

US 2012/0125898 A1 May 24, 2012

(30) Foreign Application Priority Data

Nov. 24, 2010 (KR) .......................... 10-2010-0117722

(51) Int. Cl.
*B23K 26/04* (2014.01)
*B23K 26/26* (2014.01)
*B23K 26/08* (2014.01)

(52) U.S. Cl.
CPC ........... *B23K 26/265* (2013.01); *B23K 26/0846* (2013.01)
USPC ............ 219/121.63; 219/121.62; 219/121.83; 29/460; 72/178

(58) Field of Classification Search
USPC ................... 219/121.6–121.84; 228/17.5, 27, 228/146–148; 29/728; 72/51, 52; 138/171
See application file for complete search history.

(56) References Cited

U.S. PATENT DOCUMENTS

| | | | | |
|---|---|---|---|---|
| 3,945,552 A | * | 3/1976 | Tobita et al. .................. | 228/17.5 |
| 4,568,815 A | * | 2/1986 | Kimbara et al. ............. | 219/121.7 |
| 4,649,256 A | * | 3/1987 | Minamida et al. ........ | 219/121.64 |
| 5,104,026 A | * | 4/1992 | Sturrus et al. ................. | 228/17.5 |
| 5,339,867 A | * | 8/1994 | Iorio et al. .................... | 138/140 |
| 5,560,536 A | * | 10/1996 | Moe ............................... | 228/102 |
| 5,567,335 A | * | 10/1996 | Baessler et al. .............. | 219/61.2 |
| 5,647,241 A | * | 7/1997 | Ruple et al. ..................... | 72/178 |
| 5,659,479 A | * | 8/1997 | Duley et al. ................... | 700/166 |
| 5,829,666 A | * | 11/1998 | Takeda et al. ................. | 228/147 |
| 5,841,098 A | * | 11/1998 | Gedrat et al. ............ | 219/121.63 |
| 5,886,313 A | * | 3/1999 | Krause et al. .............. | 219/121.6 |
| 5,942,132 A | * | 8/1999 | Toyooka et al. ............. | 219/61.2 |
| 6,025,572 A | * | 2/2000 | Imai et al. .................. | 219/121.7 |

(Continued)

FOREIGN PATENT DOCUMENTS

| | | |
|---|---|---|
| EP | 2161094 | 3/2010 |
| KR | 10-2005-0040375 | 5/2005 |

(Continued)

*Primary Examiner* — Henry Yuen
*Assistant Examiner* — Lawrence Samuels
(74) *Attorney, Agent, or Firm* — Lexyoume IP Meister, PLLC

(57) ABSTRACT

A roll forming system which roll-forms a shaped beam by a roll forming unit including a plurality of roll formers is disclosed. A laser welding device for the roll forming system may include: front and rear guide means disposed apart from each other at the rear of the roll forming unit, and guiding movement of the shaped beam; laser welding means mounted above and between the front and rear guide means, reciprocatedly rotating a mirror by controlling a mirror motor so as to irradiate a laser beam to a welding position of the shaped beam, and thereby forming a welding bead having a predetermined welding pattern; forming speed detecting means detecting a forming speed of the shaped beam and transmitting a signal corresponding thereto to a controller; a camera disposed at the rear of the laser welding means, photographing a welding portion of the shaped beam, and transmitting an image signal corresponding thereto to the controller.

3 Claims, 9 Drawing Sheets

(56) References Cited

U.S. PATENT DOCUMENTS

| | | | |
|---|---|---|---|
| 6,311,099 B1* | 10/2001 | Jasper et al. | 700/166 |
| 6,369,356 B1* | 4/2002 | Beck et al. | 219/121.83 |
| 6,444,946 B1* | 9/2002 | Korte | 219/121.6 |
| 6,545,246 B2* | 4/2003 | Kummle | 219/121.63 |
| 7,057,131 B2* | 6/2006 | Kruckels | 219/121.63 |
| 7,399,264 B2* | 7/2008 | Panthofer et al. | 493/274 |
| 7,586,061 B2* | 9/2009 | Hoebel et al. | 219/121.83 |
| 2001/0020609 A1* | 9/2001 | Kummle | 219/121.63 |
| 2004/0084424 A1* | 5/2004 | Kruckels | 219/121.63 |
| 2004/0194275 A1* | 10/2004 | Kummle | 29/430 |
| 2006/0243708 A1* | 11/2006 | Ikenoue | 219/121.62 |
| 2007/0246446 A1* | 10/2007 | Lee et al. | 219/121.64 |
| 2008/0116183 A1* | 5/2008 | Curry | 219/121.75 |
| 2008/0155804 A1* | 7/2008 | Lee et al. | 29/34 R |

FOREIGN PATENT DOCUMENTS

| | | |
|---|---|---|
| KR | 10-2006-0024167 | 3/2006 |
| KR | 10-2006-0074301 | 7/2006 |
| KR | 10-2009-0053081 | 5/2009 |
| KR | 10-2010-0077066 | 7/2010 |

* cited by examiner

LASER WELDING DEVICE FOR ROLL FORMING SYSTEM AND CONTROL METHOD THEREOF

CROSS-REFERENCE TO RELATED APPLICATION

This application claims priority to and the benefit of Korean Patent Application No. 10-2010-0117722 filed in the Korean Intellectual Property Office on Nov. 24, 2010, the entire contents of which are incorporated herein by reference.

BACKGROUND OF THE INVENTION (a) Field of the Invention

The present invention relates to a laser welding device for a roll forming system and a control method thereof. More particularly, the present invention relates to a laser welding device for a roll forming system and a control method thereof which is disposed at the rear of a roll forming unit and laser welds each welding position of a shaped beam in real time by controlling an output and a moving speed of a focus of a laser beam according to a forming speed.

(b) Description of the Related Art

Generally, a roll forming method is a method in which a coil is uncoiled and the coil is bent to various shapes by passing through a roll forming unit including a plurality of roll formers respectively provided with an upper forming roll and a lower forming roll. The roll forming method is used for manufacturing beams of linear type (particularly, a bumper beam for a vehicle) which is bent to the various shapes.

FIG. 1 is a schematic diagram of a roll forming system according to a conventional art which performs a roll forming method.

As shown in FIG. 1, the roll forming system according to the conventional art includes an uncoiler 201 at a front portion of a process line, and the uncoiler 201 performs an uncoil step S110 at which a coil 200 is uncoiled. A straightener 203 is provided at the rear of the uncoiler 201 and performs a straightening step S120 at which the coil uncoiled from the uncoiler 201 is straightened to a panel 250 of plate shape.

In addition, a brake press 205 is disposed at the rear of the straightener 203 and performs a piercing step S130 at which a plurality of holes for assembling is formed at the panel 250 supplied from the straightener 203.

In addition, a roll forming unit 207 including at least seven roll formers R1-R7 is disposed at the rear of the brake press 205 and performs a roll forming step S140 at which the panel 250 passing through the uncoiler 201, the straightener 203, and the brake press 205 is sequentially bent such that a shaped beam 260 is formed.

In addition, a round bender 209 for forming the shaped beam 260 to have a predetermined curvature is disposed at the rear of the roll forming unit 207. The round bender 209 is provided with a shaped surface having the predetermined curvature and performs a bending step S150 at which the shaped beam 260 passes through the shaped surface so as to be manufactured as the shaped beam 260 having the predetermined curvature.

In addition, a cutting press 211 for cutting the shaped beam 260 in a predetermined size is disposed at the rear of the round bender 209 and performs a cutting step S160 at which the shaped beam 260 is cut in a size of the finished product.

A bumper beam 300 for a vehicle bent to have a closed section, as shown in FIG. 2, is manufactured through the roll forming system.

However, in a case of the bumper beam 300, both ends of the closed section should be welded through a spot welding (SW) or a cold metal transfer (CMT) welding at an additional welding process.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a laser welding device for a roll forming system and a control method thereof having advantages that additional welding processes are not required by laser welding a shaped beam which is roll-formed at the rear of a roll forming unit in real time.

In addition, an another objective of the present invention is that an output and a moving speed of a focus of a laser beam are controlled in real time according to a forming speed of a shaped beam such that a welding bead along a predetermined zigzag line is formed at a welding position of the shaped beam. Accordingly, quality of laser welding may be improved.

A laser welding device for a roll forming system which roll-forms a shaped beam through a roll forming unit provided with a plurality of roll formers, may include: front and rear guide means disposed apart from each other at the rear of the roll forming unit, and guiding movement of the shaped beam; laser welding means mounted above and between the front and rear guide means, reciprocatedly rotating a mirror by controlling a mirror motor so as to irradiate a laser beam to a welding position of the shaped beam, and thereby forming a welding bead having a predetermined welding pattern; forming speed detecting means detecting a forming speed of the shaped beam and transmitting a signal corresponding thereto to a controller; and a camera disposed at the rear of the laser welding means, photographing a welding portion of the shaped beam, and transmitting an image signal corresponding thereto to the controller.

The front and rear guide means may respectively include: a guide frame; a lower guide roller mounted at a lower portion of the guide frame through a slider, and rolling guiding a lower surface of the shaped beam; and an upper guide roller mounted at an upper portion of the guide frame through a slider, and rolling guiding an upper surface of the shaped beam.

The laser welding means may include: a laser oscillator oscillating the laser beam according to a control of the controller; a housing mounted at an upper portion of the rear guide means through a bracket; a optic head mounted at a side of the housing, and provided therein with an optical system controlling a focus of the laser beam oscillated by the laser oscillator; the mirror provided in the housing, and reflecting the laser beam outputting from the optic head to the welding position of the shaped beam; and the mirror motor provided in the housing, and controlling a reflecting angle of the mirror by the controller so as to move the focus of the laser beam irradiated to the welding position of the shaped beam reciprocatedly within a predetermined width.

The mirror motor may be a step motor which can rotate clockwise or counterclockwise.

The forming speed detecting means may include: a rotating roller rolling contacted with the lower surface of the shaped beam and rotating proportional to the forming speed of the shaped beam; and an encoder motor connected to the rotating roller so as to rotate with the rotating roller, and transmitting a signal corresponding to a rotation speed of the rotating roller to the controller.

The rotating roller may be made of urethane or rubber being elastic.

A control method of a laser welding device for a roll forming system, may include: (a) detecting a forming speed of a shaped beam; (b) laser welding each welding position of the shaped beam by controlling an output and a moving speed of a focus of a laser beam to be reference values; (c) determining whether the forming speed is within a predetermined error range; (d) receiving and analyzing image information of the welding position of the shaped beam in a case that the forming speed is within the predetermined error range; (e) determining whether an analyzed welding pattern analyzed from the image information maintains a predetermined welding pattern; and (f) maintaining the output and the moving speed of the focus of the laser beam in a case that the analyzed welding pattern maintains the predetermined welding pattern.

The output and the moving speed of the focus of the laser beam may be controlled according to the forming speed detected in real time before performing the step (d) in a case that the forming speed is out of the predetermined error range at the step (c).

A malfunction signal may be output and the control method of the laser welding device may be finished in a case that the analyzed welding pattern does not maintain the predetermined welding pattern at the step (e).

The predetermined welding pattern may be set as a contour of a welding bead formed along a predetermined zigzag line.

Information about the contour of the welding bead may be stored as the predetermined welding pattern.

The analyzed welding pattern may be a contour of the welding bead recognized from shading difference between a basic material and the welding bead at each welding position of the shaped beam.

<Description of symbols>

| | |
|---|---|
| 1: uncoiler | 2: straightener |
| 3: brake press | 4: roll forming unit |
| 5: laser welding device | 6: round bender |
| 7: cutting press | 10: coil |
| 9: base | 20: panel |
| 30, 40, 50, 60: shaped beam | |
| 110, 120: front and rear guide means | |
| 130: laser welding means | 140: forming speed detecting means |
| 150: camera | 111, 121: guide frame |
| 113, 123, 117, 127: slider | |
| 115, 125, 119, 129: guide roller | |
| 131: laser oscillator | 132: housing |
| 133: bracket | 134: optic head |
| 135: optical fiber cable | 136: mirror |
| 137: mirror motor | 141: rotating roller |
| 143: encoder motor | WL: zigzag line |
| V: forming speed | LB: laser beam |
| WP: welding position | B: welding bead |
| W: welding portion | C: controller |
| SP: predetermined welding pattern | Wd: width |
| P: pitch | L: length |

DETAILED DESCRIPTION OF THE EMBODIMENTS

Hereinafter, an exemplary embodiment of the present invention will be described in detail with reference to the accompanying drawings.

Figure 1:
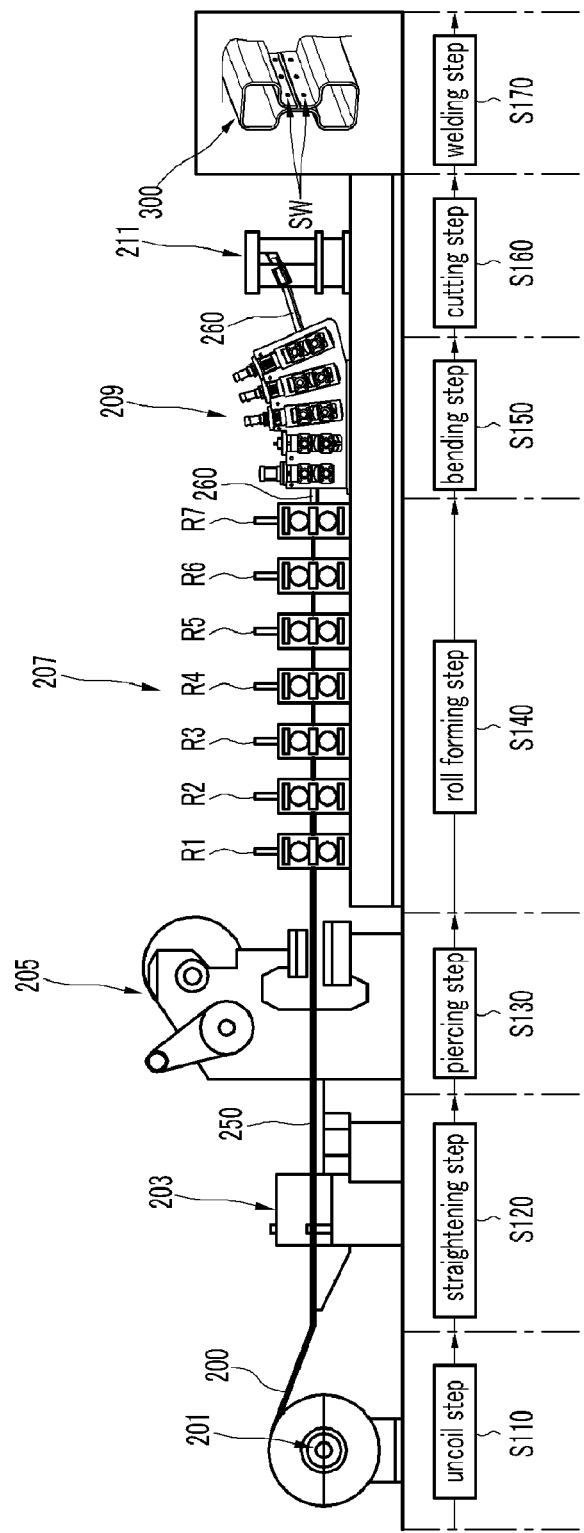
FIG. 1 is a schematic diagram of a conventional roll forming system.
Figure 2:
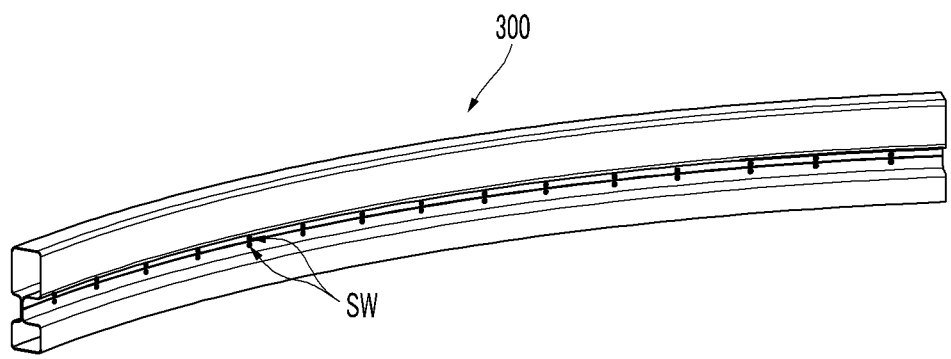
FIG. 2 is a perspective view of a bumper beam for a vehicle manufactured by a conventional roll forming system.
Figure 3:
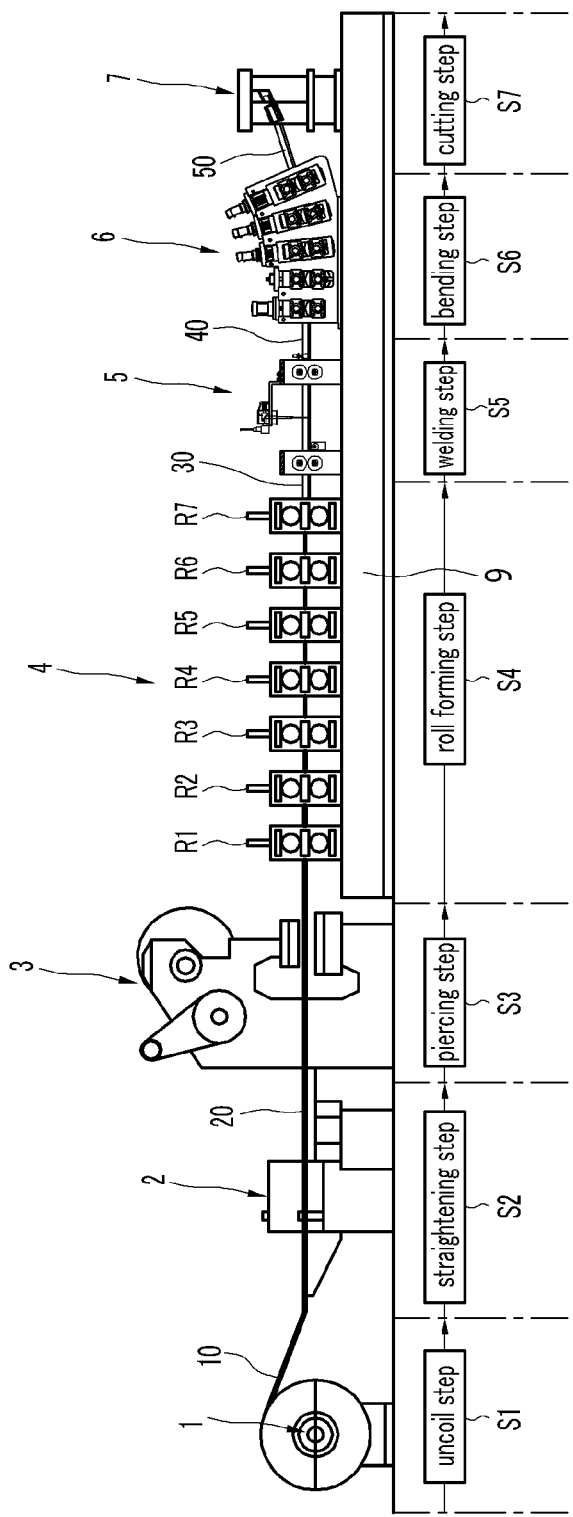
FIG. 3 is a schematic diagram of a roll forming system to which a laser welding device according to an exemplary embodiment of the present invention is applied.
Figure 4:
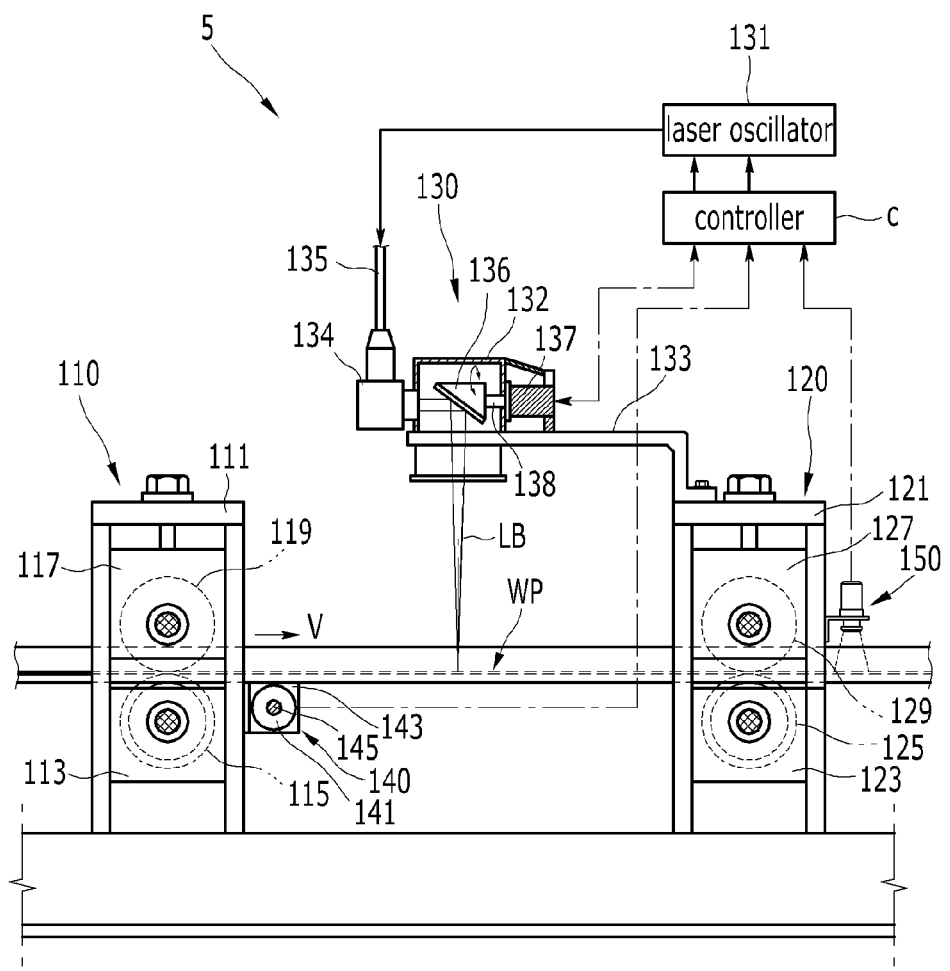
FIG. 4 is a side view of a laser welding device according to an exemplary embodiment of the present invention.

FIG. 3 is a schematic diagram of a roll forming system to which a laser welding device according to an exemplary embodiment of the present invention is applied, and FIG. 4 is a side view of a laser welding device according to an exemplary embodiment of the present invention.

A roll forming system to which a laser welding device according to an exemplary embodiment of the present invention is applied, as shown in FIG. 3, includes an uncoiler 1 disposed at the front of a process line and uncoiling a coil 10.

A straightener 2 is disposed at the rear of the uncoiler 1 and straightens the coil 10 uncoiled from the uncoiler 1 to a panel 20 of plate shape.

In addition, a brake press 3 is disposed at the rear of the straightener 2 and forms a plurality of holes for assembling a shaped beam at a panel 20 delivered from the straightener 2.

A roll forming unit 4 is disposed at the rear of the brake press 3. The roll forming unit 4 sequentially bends the panel 20 passing through the straightener 2 and the brake press 3 so as to roll-form the shaped beam 30 having a closed section.

The roll forming unit 4 includes at least seven roll formers R1-R7 disposed in series.

In addition, a laser welding device 5, as shown in FIG. 4, is disposed at the rear of the roll forming unit 4. The laser welding device 5 performs laser welding at a welding position of the shaped beam 30.

A round bender 6 including a plurality of curvature forming rolls is disposed at the rear of the laser welding device 5. The rounder bender 6 forms the shaped beam 40 passing through welding process to have a predetermined curvature.

In addition, a cutting press 7 for cutting the shaped beam 50 having the predetermined curvature in a predetermined size is disposed at the rear of the round bender 6.

The laser welding device 5, as shown in FIG. 4, includes front and rear guide means 110 and 120, laser welding means 130, forming speed detecting means 140, and a camera 150.

The front guide means 110 and the rear guide means 120 are disposed on a base 9 between a rearmost roll former R7 of the roll forming unit 4 and the round bender 6. The front guide means 110 and the rear guide means 120 are disposed apart from each other by a predetermined distance and guide a movement of the shaped beam 30.

Herein, the front and rear guide means 110 and 120 have the same constitution, function, and shape.

That is, the front and rear guide means 110 and 120 respectively includes guide frames 111 and 121 mounted on the base 9.

Lower guide rollers 115 and 125 for rolling guiding a lower surface of the shaped beam 30 are rotatably mounted at lower portions of the guide frames 111 and 121 through sliders 113 and 123.

In addition, upper guide rollers 119 and 129 for rolling guiding an upper surface of the shaped beam 30 are rotatably mounted at upper portions of the guide frames 111 and 121 through sliders 117 and 127.

The front and rear guide means 110 and 120 rolling contacts with the shaped beam 30 which is roll-formed by the roll forming unit 4 with a constant speed and guides it through the upper guide rollers 119 and 129 and the lower guide rollers 115 and 125.

That is, the upper guide rollers 119 and 129 and the lower guide rollers 115 and 125 correct spring back of the shaped beam 30 caused by residual stress and prevent both ends of the shaped beam 30 which is a welding position WP when laser welding by the laser welding device 5 from being spread.

In addition, the laser welding means 130 are disposed between and above the front and rear guide means 110 and 120 and laser weld the welding position WP of the shaped beam 30 delivered from the roll forming unit 4.

That is, a focus of a laser beam LB oscillated from a laser oscillator 131 is reciprocatedly moved within a predetermined width and the laser beam LB is irradiated to the welding position WP of the shaped beam 30. Therefore, a welding portion W having a welding bead B of a predetermined shape is formed at the shaped beam 30.

The laser welding means 130 includes the laser oscillator 131 oscillating the laser beam LB by a control signal of a controller C.

In addition, a housing 132 is disposed between and above the guide frames 111 and 121 of the front and rear guide means 110 and 120. The housing 132 is mounted through a bracket 133 at an upper end of the guide frame 121 of the rear guide means 120.

An optic head 134 is provided at one side of the housing 132. The optic head 134 is connected to the laser oscillator 131 through an optical fiber cable 135, and is provided with an optical system (not shown) therein. The optical system controls the focus of the laser beam LB oscillated by the laser oscillator 131.

In addition, a mirror 136 is disposed in the housing 132. The mirror 136 reflects the laser beam LB output from the optic head 134 to the welding position WP of the shaped beam 30.

In addition, a mirror motor 137 is disposed in the housing 132 and is connected to the mirror 136 through a rotating shaft 138.

Figure 5:
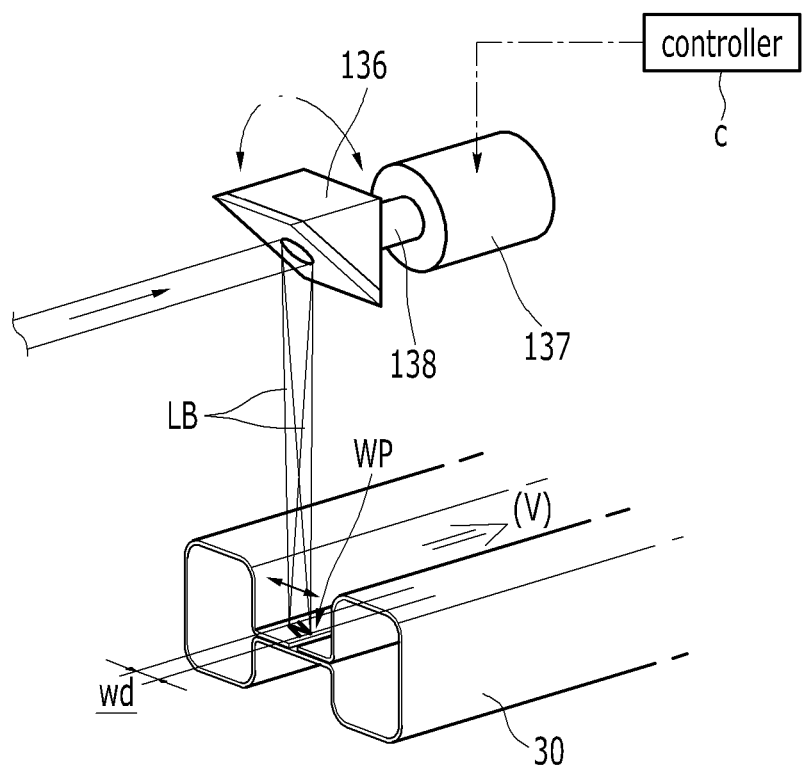
FIG. 5 is a schematic diagram showing an operation of a laser welding device according to an exemplary embodiment of the present invention.

As shown in FIG. 5, the mirror motor 137 controls a reflecting angle of the mirror 136 by the control signal of the controller C. Accordingly, the focus of the laser beam LB is reciprocatedly moved at the welding position WP of the shaped beam 30 within a predetermined width Wd.

The mirror motor 137 may be a step motor which can rotate clockwise or counterclockwise, but is not limited thereto.

In addition, the forming speed detecting means 140 is provided at one side portion of the guide frame 111 of the front guide means 110, detects a forming speed V of the shaped beam 30, and transmits a signal corresponding thereto to the controller C.

The forming speed detecting means 140 includes a rotating roller 141 rolling contacted with the lower surface of the shaped beam 30, and the rotating roller 141 rotates with a speed proportional to the forming speed V of the shaped beam 30.

Herein, the rotating roller 141 is made of urethane material such that no scratch is formed at the lower surface of the shaped beam 30 when rolling contacted with it. The rotating roller 141 may be made of rubber material which is elastic as well as urethane material.

In addition, an encoder motor 143 is mounted at one side portion of the guide frame 111 of the front guide means 110. A rotating shaft 145 of the encoder motor 143 is connected to the rotating roller 141.

That is, the encoder motor 143 generates electric signal according to a rotation speed of the rotating roller 141 and transmits the signal to the controller C. The controller C calculates the forming speed V of the shaped beam 30 based on the signal.

Figure 6:
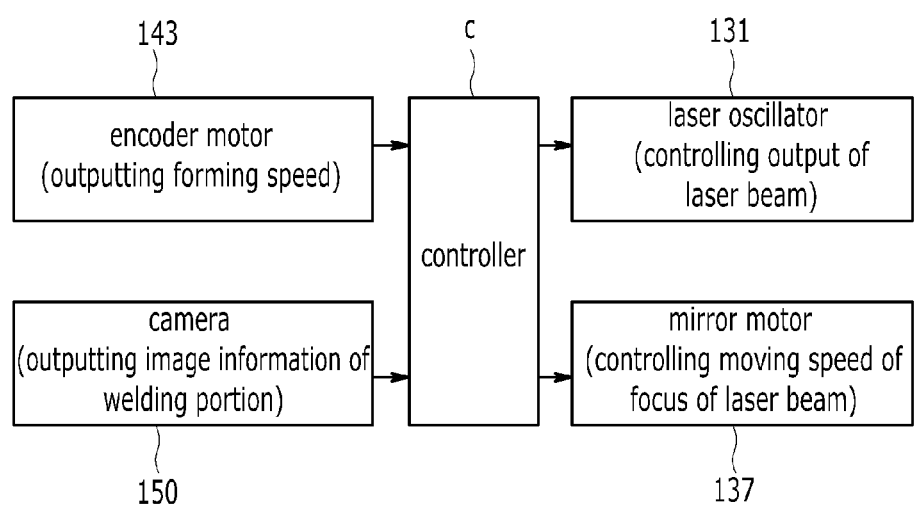
FIG. 6 is a block diagram showing constituent elements for controlling a laser welding device according to an exemplary embodiment of the present invention.

The camera 150 is disposed at the rear of the guide frame 121 of the rear guide means 120, photographs the welding portion W of shaped beam 40, and transmits image information corresponding thereto to the controller C. A conventional CCD camera may be used as the camera 150, Constituent elements for controlling the laser welding device 5 are shown in FIG. 6. That is, the controller C receives the forming speed V of the shaped beam 30 from the encoder motor 143 and controls the output of the laser beam LB oscillated from the laser oscillator 131 according to a predetermined value in a predetermined map table of each forming speed.

The controller C, as shown in FIG. 5, controls the mirror motor 137 according to the predetermined value in the predetermined map table of each forming speed of the shaped beam 30 such that the mirror 136 is reciprocated. At this time, the rotation speed of the mirror 136, that is the moving speed of the focus of the laser beam LB irradiated to the welding position WP of the shaped beam 30 is controlled according to the forming speed V.

In addition, the controller C receives from the camera 150 the image information of the welding portion W of the shaped beam 40 which is laser welded and determines welding quality. Based on the determination, the controller C maintains or stops operations of the laser oscillator 131 and the mirror motor 137.

Herein, the controller C is provided with a map in which a predetermined welding pattern SP is stored so as to determine the welding quality of the welding portion W.

Figure 7:
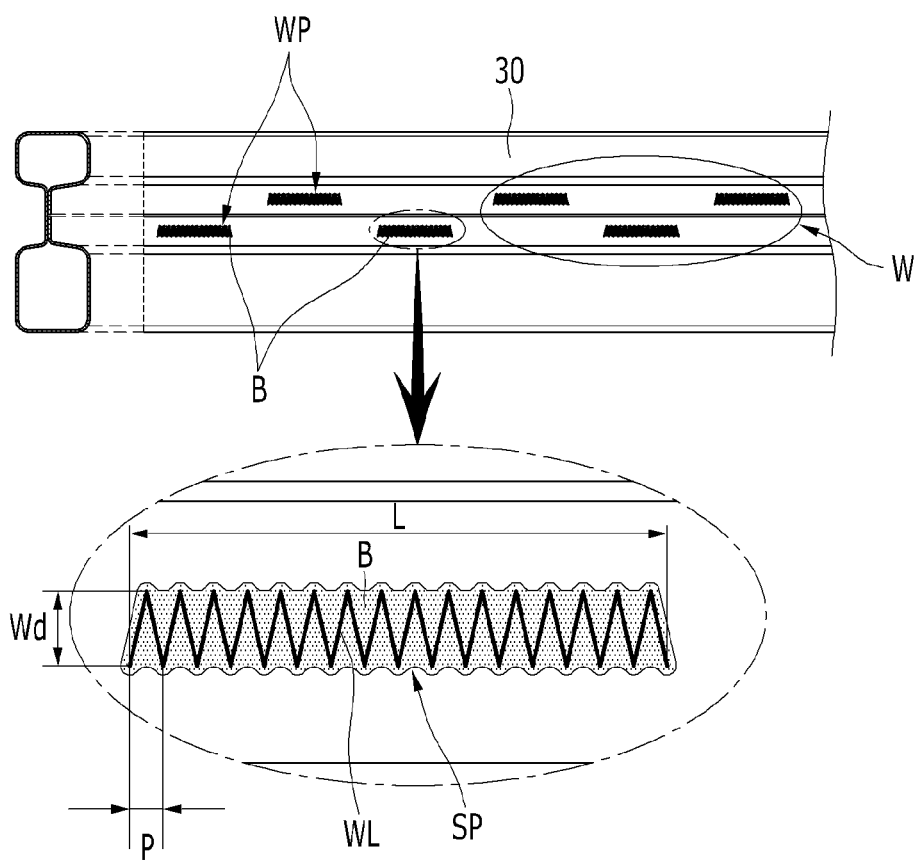
FIG. 7 is a top plan view of a shaped beam illustrating a predetermined welding pattern of a welding portion by a laser welding device according to an exemplary embodiment of the present invention.

The predetermined welding pattern SP, as shown in FIG. 7, is set as a contour of the welding bead B which is formed along a predetermined zigzag line WL.

The predetermined welding pattern SP can be attained when the moving speed of the focus of the laser beam LB is controlled according to the forming speed V of the shaped beam 30.

If the output of the laser beam LB is 5.8 kW, the predetermined welding pattern SP can be attained when the forming speed V is 5 m/min and the moving speed of the focus of the laser beam LB is 32 m/min. At this time, width Wd and pitch P of the welding bead B may be 1.6 mm and 0.5 mm, respectively.

The contour of the welding bead B is converted to data through signal processing and is stored in the predetermined welding pattern SP of the controller C.

Meanwhile, the controller C controls the laser oscillator 131 so as to control oscillating timing of the laser beam LB.

Hereinafter, a control method of the laser welding device 5 according to an exemplary embodiment of the present invention will be described in detail in relation to the roll forming system.

As shown in FIG. 3, an uncoil step S1 at which the coil 10 is uncoiled by using the uncoiler 1 disposed at the front of the process line is performed.

After performing the uncoil step S1, a straightening step S2 at which the coil 10 uncoiled from the uncoiler 1 is straightened to the panel 20 by using the straightener 2 disposed at the rear of the uncoiler 1 is performed.

By using the brake press 3 disposed at the rear of the straightener 2, a piercing step S3 at which a plurality of holes for assembling is formed at the panel 20 delivered from the straightener 2 is performed.

After that, a roll forming step S4 at which the panel 20 delivered from the brake press 3 is sequentially bent and the shaped beam 30 having the closed section is formed by using the roll forming unit 4 disposed at the rear of the brake press 3 is performed.

Figure 8:
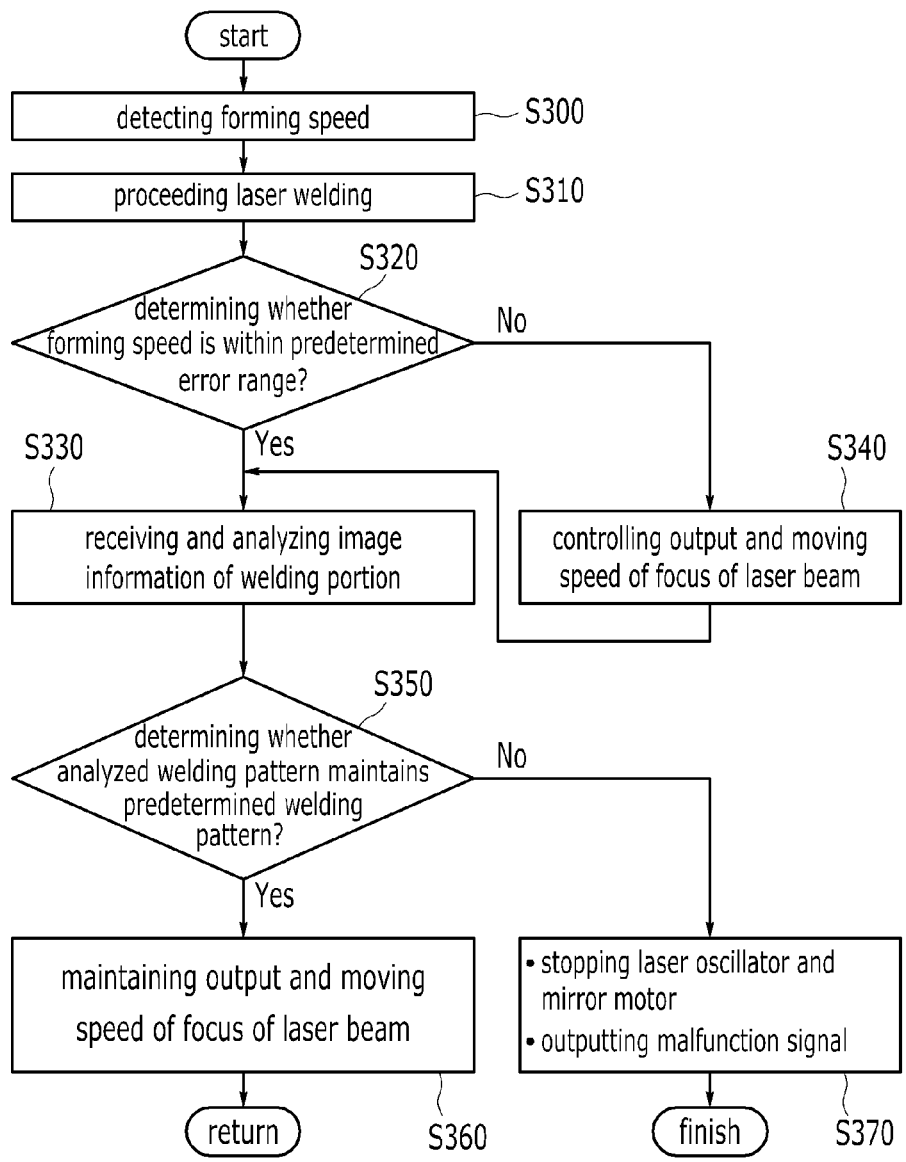
FIG. 8 is a flowchart showing a control method of a laser welding device according to an exemplary embodiment of the present invention.

The laser welding device 5 according to an exemplary embodiment of the present invention, as shown in FIG. 4, is disposed at the rear of the roll forming unit 4. A welding step S5 at which the laser beam LB is irradiated to each welding position WP of the shaped beam 30 according to the control method of the laser welding device shown in FIG. 8 is performed.

In addition, by using the round bender 6 disposed at the rear of the laser welding device 5, a bending step S6 at which the shaped beam 40 delivered from the laser welding device 5 is formed to have a predetermined curvature is performed.

Figure 9:
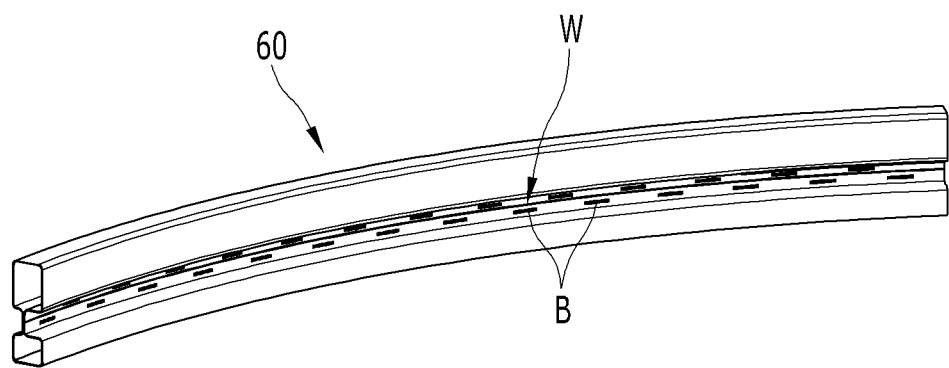
FIG. 9 is a perspective view of a shaped beam manufactured by a roll forming system to which a laser welding device according to an exemplary embodiment of the present invention is applied.

A cutting step S7 at which the shaped beam 50 delivered from the round bender 6 is cut in the predetermined size by using the cutting press 7 disposed at the rear of the round bender 6 is performed. Accordingly, the shaped beam 60 shown in FIG. 9 is manufactured.

Hereinafter, the control method of the laser welding device according to an exemplary embodiment of the present invention will be described in detail with reference to FIG. 8.

The controller C detects the forming speed V of the shaped beam 30 through the encoder motor 143 at a step S300.

In addition, the controller C controls the output of the laser beam LB oscillated from the laser oscillator 131 and the moving speed of the focus of the laser beam LB according to the rotation of the mirror motor 137 to be reference values. Accordingly, the laser welding proceeds at a step S310.

At this time, each welding position WP of the shaped beam 30 is laser welded according to the predetermined welding pattern SP and the welding portion W is formed.

The predetermined welding pattern SP, as shown in FIG. 7, is set as the contour of the welding bead B formed along the predetermined zigzag line WL at each welding position WP of the shaped beam 30.

In addition, the controller C determines whether the forming speed V detected by the encoder motor 143 is within a predetermined error range at a step S320.

If the forming speed V detected in real time is within the predetermined error range, the controller C receives and analyzes the image information of the welding portion W on the shaped beam 30 through the camera 150 at a step S330.

On the contrary, if the forming speed V detected in real time is out of the predetermined error range, the controller C controls the output and the moving speed of the focus of the laser beam LB according to the forming speed V at a step S340, and proceeds to the step S330. The output and the moving speed of the focus of the laser beam LB according to the forming speed V may be set through various experiments, and may be stored in the map table.

After performing the step S330, the controller C determines whether an analyzed welding pattern recognized from the image information of the welding portion W maintains the predetermined welding pattern SP at a step S350.

If the analyzed welding pattern maintains the predetermined welding pattern SP, the controller C controls the laser oscillator 131 and the mirror motor 137 to maintain the output and the moving speed of the focus of the laser beam LB at a step S360.

On the contrary, if the analyzed welding pattern does not maintain the predetermined welding pattern SP, the controller C controls the laser oscillator 131 and the mirror motor 137 to be stopped and outputs a malfunction signal at a step S370.

The analyzed welding pattern is a contour of the welding bead B recognized from shading difference between a basic material and the welding bead B at the welding portion W of the shaped beam 30 which is laser welded in real time.

That is, the analyzed welding pattern is attained by converting the contour of the welding bead B detected by the camera 150 to data through signal processing. The controller C compares the analyzed welding pattern with the predetermined welding pattern SP and determines the welding quality.

The shaped beam 60 manufactured by the laser welding device and the control method according to an exemplary embodiment of the present invention is shown in FIG. 9. The shaped beam 60 may be used as a bumper beam for a vehicle. At this time, the welding beads B having a predetermined length L are formed alternately along a length direction thereof at the back surface of the bumper beam.

As described above, the laser welding device for roll forming system according to the present exemplary embodiment is applied in the roll forming system. Accordingly, after the shaped beam 30 having the closed section is roll-formed, each welding position WP of the shaped beam 30 may be laser welded at once. So, additional welding processes may be removed.

In addition, the output and the moving speed of the focus of the laser beam LB is controlled according to the forming speed V of the shaped beam 30 in real time in the control method of the laser welding device for the roll forming system according to an exemplary embodiment of the present invention. Therefore, the welding bead B having the predetermined welding pattern SP is formed at each welding position WP of the shaped beam 30. Accordingly, quality of the laser welding may be improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A laser welding device for a roll forming system which roll-forms a shaped beam through a roll forming unit provided with a plurality of roll formers, the laser welding device comprising:

front and rear guide means disposed apart from each other at a rear portion of the roll forming unit, and guiding movement of the shaped beam;

laser welding means mounted above and between the front and rear guide means, reciprocately rotating a mirror by controlling a mirror motor so as to irradiate a laser beam to a welding position of the shaped beam, and thereby forming a welding bead having a predetermined welding pattern;

forming speed detecting means disposed at a side of the front guide means, detecting a forming speed of the shaped beam, and transmitting a signal corresponding to the detected forming speed;

a camera disposed at a back portion of the rear guide means, photographing a welding portion of the shaped beam, and transmitting an image signal corresponding to the photographed welding portion; and a controller receiving the signal from the forming speed detecting means and receiving the image signal from the camera, controlling the forming speed such that the forming speed is maintained within a predetermined error range based on the received signal, and controlling a welding pattern to maintain the predetermined welding pattern based on the received image signal, wherein the front and rear guide means respectively comprise a guide frame, a lower guide roller mounted at a lower portion of the guide frame through a slider, and rolling guiding a lower surface of the shaped beam, and an upper guide roller mounted at an upper portion of the guide frame through a slider, and rolling guiding an upper surface of the shaped beam, wherein the laser welding means comprise a laser oscillator oscillating the laser beam according to a control of the controller, a housing mounted at an upper portion of the rear guide means through a bracket, a optic head mounted at a side of the housing, and provided therein with an optical system controlling a focus of the laser beam oscillated by the laser oscillator, the mirror provided in the housing, and reflecting the laser beam outputting from the optic head to the welding position of the shaped beam, and the mirror motor provided in the housing, and controlling a reflecting angle of the mirror by the controller so as to move the focus of the laser beam irradiated to the welding position of the shaped beam reciprocatedly within a predetermined width, and wherein the mirror motor is a step motor which can rotate clockwise or counterclockwise.

2. The laser welding device of claim 1, wherein the forming speed detecting means comprise:

a rotating roller rolling contacted with the lower surface of the shaped beam and rotating proportional to the forming speed of the shaped beam; and an encoder motor connected to the rotating roller so as to rotate with the rotating roller, and transmitting a signal corresponding to a rotation speed of the rotating roller to the controller.

3. The laser welding device of claim 2, wherein the rotating roller is made of urethane or rubber being elastic.

* * * * *